(12) United States Patent
Bhat

(10) Patent No.: US 11,474,928 B2
(45) Date of Patent: Oct. 18, 2022

(54) REMOTE SYSTEM FILTERED DATA ITEM LOGGING

(71) Applicant: ServiceNow, Inc., Santa Clara, CA (US)

(72) Inventor: Ganesh Parameshwar Bhat, Bangalore (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/093,581

(22) Filed: Nov. 9, 2020

(65) Prior Publication Data
US 2022/0147436 A1 May 12, 2022

(51) Int. Cl.
| | |
|---|---|
| *G06F 9/44* | (2018.01) |
| *G06F 9/455* | (2018.01) |
| *G06F 11/36* | (2006.01) |
| *G06F 11/273* | (2006.01) |
| *G06F 11/267* | (2006.01) |
| *H04L 9/40* | (2022.01) |
| *H04L 67/01* | (2022.01) |
| *H04L 67/133* | (2022.01) |

(52) U.S. Cl.
CPC ...... *G06F 11/3636* (2013.01); *H04L 63/0245* (2013.01); *H04L 67/01* (2022.05); *H04L 67/133* (2022.05); *G06F 11/3664* (2013.01)

(58) Field of Classification Search
CPC ............. G06F 11/3636; G06F 11/3072; G06F 11/3476; G06F 11/3409; G06F 2201/86; G06F 9/542; G06Q 30/02
See application file for complete search history.

(56) References Cited

U.S. PATENT DOCUMENTS

| | | | | |
|---|---|---|---|---|
| 6,101,445 A | * | 8/2000 | Alvarado | E21B 47/12 |
| | | | | 702/9 |
| 2013/0332424 A1 | * | 12/2013 | Nos | G06F 16/1734 |
| | | | | 707/687 |
| 2016/0132398 A1 | * | 5/2016 | Cadarette | G06F 16/162 |
| | | | | 707/674 |
| 2017/0041188 A1 | * | 2/2017 | Panchapakesan | H04L 41/0809 |
| 2017/0109253 A1 | * | 4/2017 | Shen | G06F 11/3636 |
| 2020/0153855 A1 | * | 5/2020 | Kirti | H04L 63/20 |

OTHER PUBLICATIONS

Taheri et al., DiffTrace: Efficient Whole-Program Trace Analysis and Diffing for Debugging, 12 pages (Year: 2019).*

* cited by examiner

*Primary Examiner* — Thuy Dao
(74) *Attorney, Agent, or Firm* — Van Pelt, Yi & James LLP

(57) ABSTRACT

A program content for execution at a system that is a part of a user's internal computer network is received, wherein the program content specifies data to be logged. It is determined that a data item identified by the program content belongs to a specific type. In response to the determination that the data item belongs to the specific type, it is determined whether the data item identified by the program content meets a filter specification separate from the program content. In response to a determination that the data item meets the filter specification, a log item of the data item is automatically sent to a remote system that is not a part of the user's internal computer network.

20 Claims, 6 Drawing Sheets

REMOTE SYSTEM FILTERED DATA ITEM LOGGING

BACKGROUND OF THE INVENTION

Log files are records that include information associated with computing events. A log file can include data combined from multiple sources and/or multiple computing events. Furthermore, a log file can be comprised of various types of log data. For example, error log data describes information associated with computer software and/or hardware errors (typically ones that are severe enough to require user intervention). As is described herein, various other types of log data exist. In many scenarios, log files are large in size and difficult to analyze. Retrieving log files for analysis can be cumbersome. Thus, it would be beneficial to develop techniques directed toward making utilization and analysis of log files more efficient.

BRIEF DESCRIPTION OF THE DRAWINGS

Various embodiments of the invention are disclosed in the following detailed description and the accompanying drawings.

DETAILED DESCRIPTION

Figure 1:
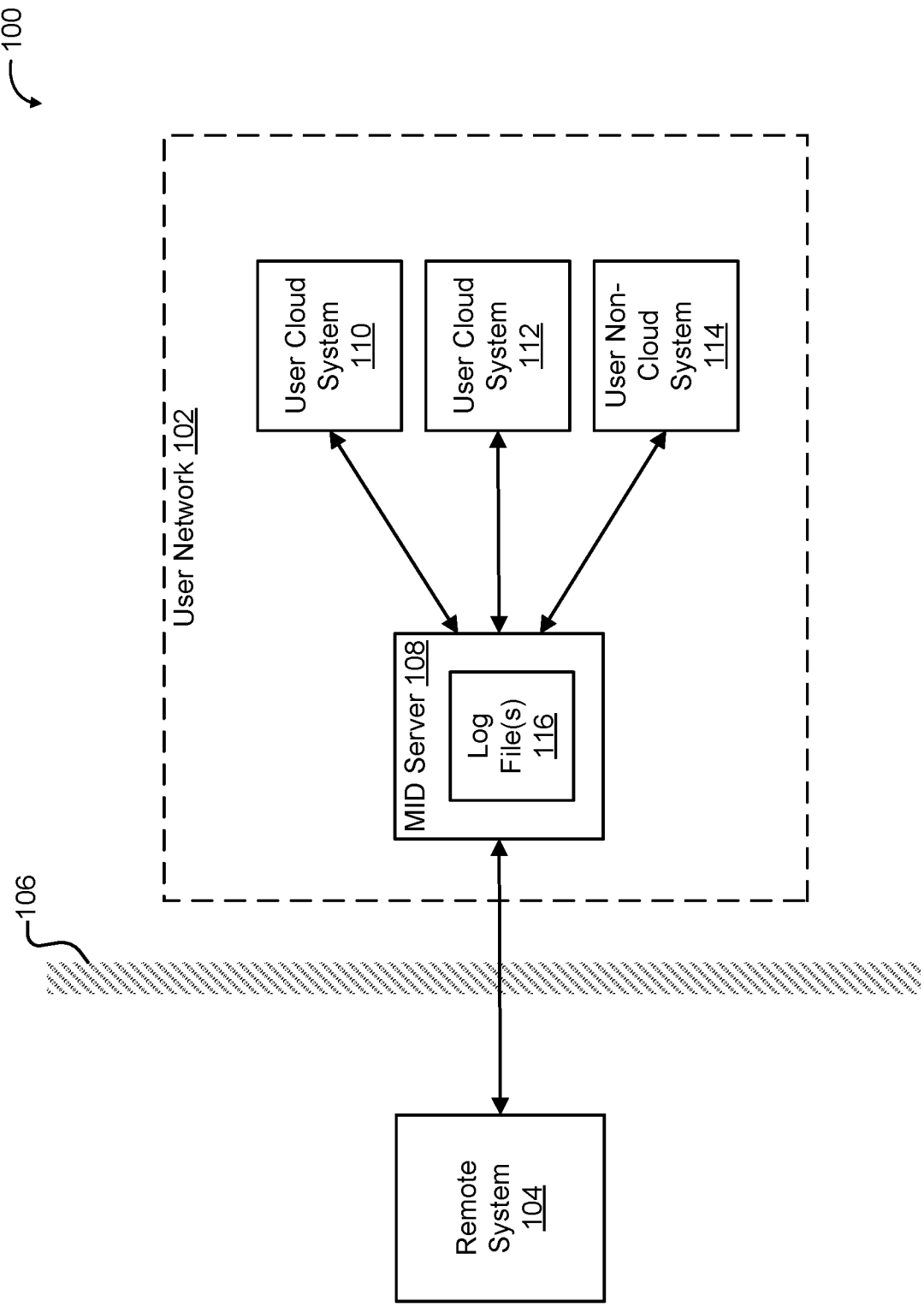
FIG. 1 is a block diagram illustrating an embodiment of a system for performing data item logging.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A program content for execution at a system that is a part of a user's internal computer network is received, wherein the program content specifies data to be logged. It is determined that a data item identified by the program content belongs to a specific type. In response to the determination that the data item belongs to the specific type, it is determined whether the data item identified by the program content meets a filter specification separate from the program content. In response to a determination that the data item meets the filter specification, a log item of the data item is automatically sent to a remote system that is not a part of the user's internal computer network.

As described in further detail herein, the techniques disclosed herein have various technological benefits, e.g., to developers of system applications and users of these application. These technological benefits include, with respect to logging analysis, improved time period specificity, improved logging method specificity, improved execution context specificity, improved category specificity, and improved level (e.g., error, info, warning, trace, and debug levels) specificity. Another technological benefit is improved correlation of log items to computing events through use of timestamp functionality. The techniques disclosed herein have technological advantages that allow for quick triage and resolution of computer system problems and issues.

In some embodiments, a management, instrumentation, and discovery (MID) server stores log data (e.g., in one or more log files). As used herein, a MID server refers to a Java application that runs as a Windows service or UNIX daemon on a server in a user's local computer network. In various embodiments, the MID server facilitates communication and movement of data between the user's local computer network and a remote system. Information technology (IT) operation management can utilize the MID server to obtain data or perform operations in the user's local computer network. The MID server acts as an access/entry point behind a firewall protecting the user's local computer network with which the remote system (e.g., a remote IT operation management system) can interface. For example, operations can be performed in the MID server by coding "JavaScript script includes" (computer program content to be executed by the MID server) that are deployed to the MID server. Upon receiving requests from specified software agents, in specified forms and/or patterns, or through specified interfaces, such as a cloud application programming interface (CAPI), the MID server can execute script includes to perform operations and return results. MID server script includes can produce debug, trace, error, warning, or information level log data and serve to help application developers perform triage within the user's local computer network for rapid identification and/or resolution of computer system issues.

Prior approaches to MID logging involve creating a log file that can only be retrieved upon completion of script execution, which does not provide instant feedback or the ability to obtain focused logs for a given session to triage computer system problems. This results in longer triaging sessions and difficulties in narrowing problem areas within very large logs. Thus, the techniques disclosed herein, which provide conditional sorting/filtering functionality, are technologically advantageous. The techniques disclosed herein allow for differentiation based on time period, logging method, execution context, other categories, and logging level (e.g., error, warning, info, debug, and trace levels of logging). Error level logging refers to recording of computer system errors (typically ones severe enough to require direct user intervention), warning level logging refers to recording of computer system warnings (typically issues of less severity than errors and not requiring direct user intervention), info level logging refers to recording of information that is generally useful (e.g., start/stop times of processes, system configuration parameters, etc.) but not typically necessary to obtain under normal system operating conditions, debug level logging refers to recording of information associated with a monitoring mode used to diagnose computer system problems (typically utilizing debugging computer code that is executed in a same thread as computer code to be debugged), and trace level logging refers to recording of information associated with a monitoring mode used to obtain computer system operation information (typically by performing monitoring using a thread different from a thread with computer code to be monitored). As used herein, logging (also referred to herein as data logging, data item logging, etc.) refers to recording data item information (e.g., error, warning, info, debug, and trace information) in computer files (referred to herein as log files, data log files, logs, data logs, data item logs, etc.).

FIG. 1 is a block diagram illustrating an embodiment of a system for performing data item logging. In the example shown, system 100 includes user network 102, remote system 104, and firewall 106.

In the example illustrated, user network 102 includes MID server 108 and various associated computer systems within user network 102 (e.g., user cloud system 110, user cloud system 112, and user non-cloud system 114). The number and types of such systems shown is merely illustrative. It is possible for system 100 to include more or fewer computers systems and different types of systems. User network 102 is a computer network that communicatively connects MID server 108 and the associated computer systems. Examples of user network 102 include one or more of the following: a direct or indirect physical communication connection, mobile communication network, Internet, intranet, Local Area Network, Wide Area Network, Storage Area Network, and any other form of connecting two or more systems, components, or storage devices together.

In the example illustrated, MID server 108 stores log file(s) 116. One or more data log files are stored by MID server 108. In some embodiments, MID server 108 includes a software portion (e.g., a Java application that runs as a Windows service or UNIX daemon) as well as a hardware portion (e.g., a physical server, such as a computer or other hardware component) that runs the software portion. In some embodiments, MID server 108 is a virtual machine running on a physical machine of user network 102. In some embodiments, MID server 108 determines the existence of other computing resources in user network 102 (e.g., user cloud system 110, user cloud system 112, and user non-cloud system 114) and acts as a proxy between these computing resources and remote system 104. In some embodiments, MID server 108 is configured for this proxy role including by running a portion of an application that is also running on remote system 104. In this manner, remote system 104 is able to access computing resources of user network 102, bypassing firewall 106 by going through MID server 108. The example shown is merely illustrative. As described in further detail herein, in various embodiments, MID server 108 includes various other components. Firewall 106 comprises a network security system that monitors and controls incoming and outgoing network traffic based on specified security rules. Firewall 106 establishes a barrier between user network 102 and untrusted networks. For example, in various embodiments, remote system 104 connects to user network 102 through an untrusted network (not shown), such as the Internet.

In some embodiments, log file(s) 116 is stored on a storage device of a hardware portion of MID server 108 (e.g., a hard disk drive, a solid-state drive, etc.). In various embodiments, MID server 108 facilitates communication and movement of data between user network 102 and remote system 104 through firewall 106. In various embodiments, MID server 108 runs scripts to obtain log data for log file(s) 116. In many scenarios, software developers access log data to diagnose computer system problems and issues. For example, information associated with problems and issues while running user cloud system 110, user cloud system 112, and user non-cloud system 114 can be logged and stored in log file(s) 116. In some embodiments, remote system 104 performs IT operation management on the abovementioned systems of user network 102 and problems and issues associated with this IT operation management are logged. MID server 108 can be used by remote system 104 to obtain data and perform operations in user network 102. Stated alternatively, MID server 108 can act as an access point and interface for remote system 104 to connect to the various computer systems in user network 102. In various embodiments, user cloud system 110 and user cloud system 112 are comprised of one or more computers, other hardware components, and/or software components that are accessible via the Internet and exist within user network 102. In various embodiments, user non-cloud system 114 is comprised of one or more computers, other hardware components, and/or software components that are not accessible via the Internet and exist within user network 102. User non-cloud system 114 may be located in a same physical location as a physical machine running MID server 108.

The techniques disclosed herein remedy inadequacies associated with prior approaches to accessing log data. For example, prior approaches involve accessing log data in a scattered and unorganized manner in which there is no functionality to perform debug and trace modifications. Furthermore, because log files can be large and difficult to download, real time analysis is not possible with prior approaches.

In various embodiments, log data stored by MID server 108 in log file(s) 116 is accessed by remote system 104. In various embodiments, application logic of remote system 104 is distributed between remote system 104 and MID server 108 because MID server 108 is deployed inside user network 102 and thus capable of accessing computing resources in user network 102 (e.g., virtual machines, storage, etc.). Furthermore, by utilizing MID server 108 as an access point, computing resources of user network 102 can be scaled up or down without affecting system 100's structure. In some embodiments, remote system 104 performs IT operation management, configuration management database (CMDB), and/or interface operations associated with computing resources of user network 102.

In the example shown, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. For example, additional systems connected to MID server 108 may exist. The number of components and the connections shown in FIG. 1 are merely illustrative. Components not shown in FIG. 1 may also exist.

Figure 2:
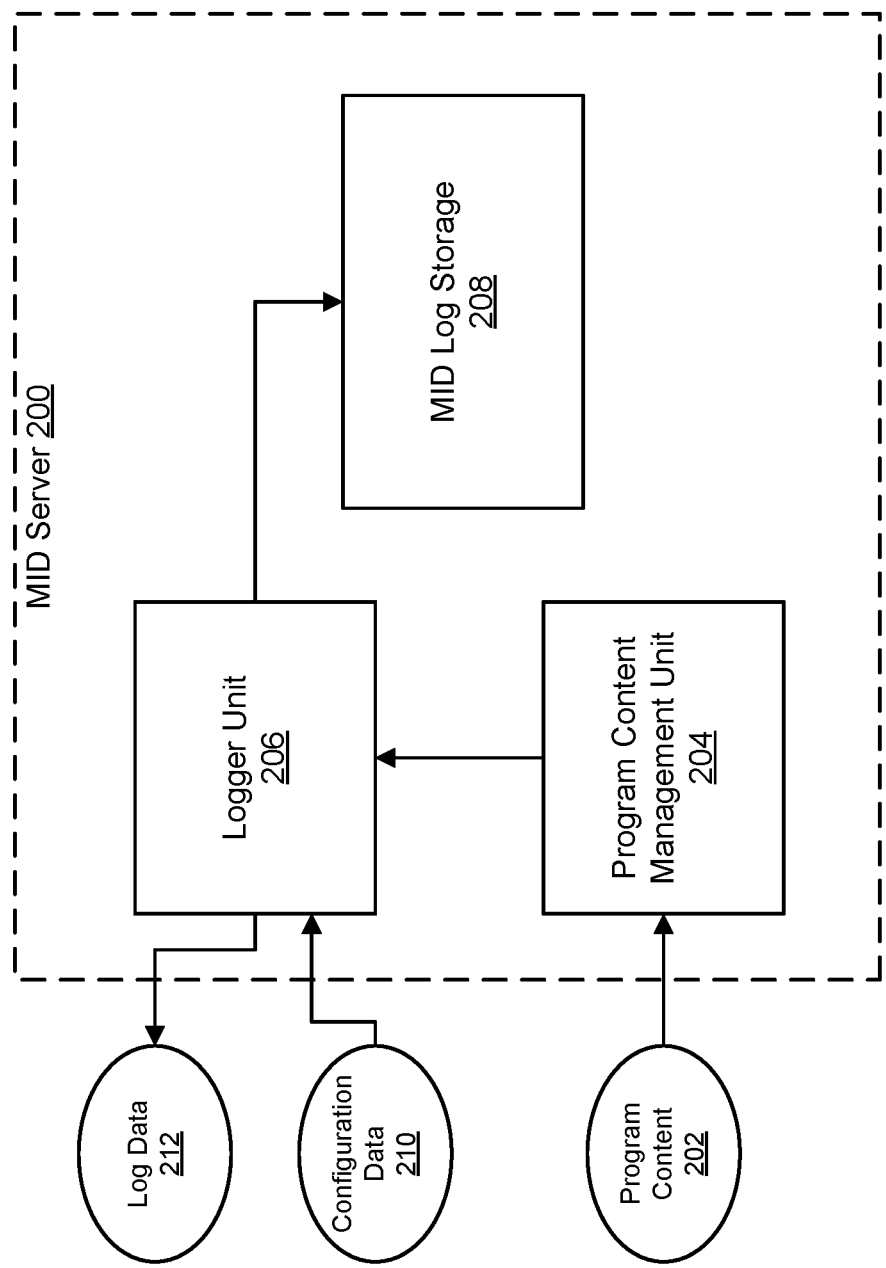
FIG. 2 is a block diagram illustrating an embodiment of a MID server.

FIG. 2 is a block diagram illustrating an embodiment of a MID server. In some embodiments, MID server 200 is MID server 108 of FIG. 1.

In the example illustrated, program content 202 is received by program content management unit 204 of MID server 200. In some embodiments, program content 202 includes a list of commands and/or functions that can be executed by a specified computer program or scripting engine. Stated alternatively, program content 202 can be a script or part thereof that a scripting engine of MID server 200 is configured to recognize and utilize to perform logging. In some embodiments, program content 202 comprises JavaScript script includes that store JavaScript functions and/or classes to be run on MID server 200. Program content management unit 204 is software that receives and stores program content 202. Program content 202 does not need to be repeatedly transmitted to MID server 200; rather, it can be stored in MID server 200. In various embodiments, program content management unit 204 receives requests to execute the received and stored program content (e.g., program content 202). The requests can arrive from specified software agents, in specified forms and/or patterns, or through specified interfaces, such as a CAPI. In some embodiments, the requests are sent by a remote system (e.g., remote system 104 of FIG. 1). The requests cause program content stored on MID server 200 (e.g., script includes) to be executed to perform logging operations. In various embodiments, the program content (e.g., program content 202) specifies data items to be logged. Examples of data items to be logged include errors, warning, parameters, configurations, statuses, messages, and other activities and information associated with operations and events occurring in various computers systems of a network (e.g., in the various systems of user network 102 of FIG. 1).

In the example shown, in various embodiments, requests to perform logging (e.g., requests to execute script includes) causes program content management unit 204 to make calls to logger unit 206 to log data items that MID server 200 receives from systems to which MID server 200 is communicatively connected (data items and connections not shown). Logger unit 206 examines data items and logs them by writing log items of the data items to MID log storage 208. In some embodiments, MID log storage 208 includes a storage device, such as a hard disk drive, a solid-state drive, or other hardware component. In various embodiments, log items stored in MID log storage 208 are in the format of a log file that is large and difficult to analyze. Such a log file is typically difficult to transfer and cannot be viewed in real time. In order to remedy such deficiencies, in various embodiments, logger unit 206 performs an additional filtering step that allows for real time analysis of log data of MID server 200. In various embodiments, configuration data 210 is received by logger unit 206 to configure filter settings for logger unit 206. In various embodiments, logger unit 206 determines that a data item belongs to a specific type and in response to the determination that the data item belongs to the specific type determines whether the data item meets a filter specification set by configuration data 210. The filter specification is separate from the program content (logging and filtering are separate steps). In various embodiments, in response to a determination that the data item meets the filter specification, a log item of the data item is automatically sent as log data 212 to a remote system (e.g., remote system 104 of FIG. 1). MID server 200 performs script-based logging. In some embodiments, a logging engine already included on MID server 200 performs logging. An existing application programming interface (API) may be utilized to access the logging engine. It is also possible for a separate logger with a separate API to be provided to MID server 200 as a logging interface for a remote system.

Logger unit 206 is software that determines which data items are stored as log items in MID log storage 208 and/or are transmitted from MID server 200 as log data 212. Logger unit 206 determines which data items to store as log items in MID log storage 208 based at least in part on program content 202 and determines which data items to send as log items in log data 212 based at least in part on configuration data 210. In many scenarios, log data 212 is one or more log items that are transmitted from MID server 200 in addition to being stored in MID log storage 208. It is also possible to transmit the log items in log data 212 and not store them in MID log storage 208. In various embodiments, log items stored in MID log storage 208 are stored in one or more log files (e.g., log file(s) 116 of FIG. 1). In various embodiments, each log item sent as log data 212 is information (e.g., in a human readable text format) that describes information associated with operation (e.g., normal operation, faulty operation, etc.) of computer software and/or hardware communicatively connected to MID server 200. In some embodiments, log data 212 is sent to a communication endpoint, such as a REpresentational State Transfer (REST) endpoint, of a remote system. By sending specific log items as log data 212, log items can be inspected in real time by the remote system without needing to download log files of MID log storage 208. Log information in the form of log data 212 is sent intermittently and is sent based on filter conditions set by configuration data 210 being met.

In various embodiments, configuration data 210 includes a parameter specifying filtering based on a level of logging. Example levels include error, warning, info, debug, and trace. For example, if configuration data 210 indicates only error level logs are requested by a remote system, then only error associated log items are transmitted as log data 212. In various embodiments, configuration data 210 includes one or more parameters specifying filtering based on tags, wherein tags correspond to categories, labels, etc. that can be utilized to differentiate data items to be logged. In various embodiments, configuration data 210 includes one or more parameters specifying filtering based on logging methods, such as which script includes are executed or specific groups of functions or computer code within scripts that are executed. For example, configuration data 210 can specify that only log items captured by a specified script include are to be transmitted as log data 212. In some embodiments, filtering of what is sent as log data 212 is based at least in part on matching terms in a text field of log items. For example, a specific application name may be searched for and matching results are sent as log data 212. In various embodiments, configuration data 210 includes one or more parameters specifying filtering based on time periods (e.g., only transmit log items as log data 212 that are logged during specified hours or times of the day). Filtering can be performed based on log item timestamps for increased precision. Filtering can also be performed based on various execution context properties (e.g., execution identifier). Filtering can also be performed based on logging session or other formats for organizing logging periods. In some embodiments, configuration data 210 parameters are specified as regular expressions or according to other patterned formats. Logger unit 206 performs filtering of data items logged according to configuration data 210 and transmits the filtered results as log data 212.

In various embodiments, configuration data 210 includes a parameter specifying a batching level indicating how many log items (e.g., 1, 10, 50, 100, etc.) to transmit at a time. Batching log items conservers network communication overhead resources. It is also possible to batch by time (e.g., transmit every second, minute, 10 minutes, 30 minutes, hour, or another specified period). In various embodiments, configuration data 210 is determined by a remote system, such as through a user interface (e.g., see FIG. 3). In some embodiments, configuration data 210 includes one or more parameters specifying whether log items and/or which log items should be stored in MID log files (e.g., in MID log storage 208). For example, typically, log items are not stored in MID log files if logger unit 206 is logging at a debug or trace level because these levels are typically associated with a large amount of information that could overwhelm MID server 200 storage capabilities. Rather, debug and trace levels are often a transient logging occurrence intended to transmit log items to a software developer in real time to diagnose a particular issue. MID server logs, on the other hand, can be considered logs that are more historical in nature and hold information with longer term utility. Info level logging typically causes log items to be stored in MID server logs. During info level logging, log items may not be transmitted to a remote system as log data 212. Thus, in various embodiments, flow of log items is based on the type of logging being performed.

In the example shown, portions of the communication path between the components are shown. Other communication paths may exist, and the example of FIG. 2 has been simplified to illustrate the example clearly. Although single instances of components have been shown to simplify the diagram, additional instances of any of the components shown in FIG. 2 may exist. The number of components and the connections shown in FIG. 2 are merely illustrative. Components not shown in FIG. 2 may also exist.

Figure 3:
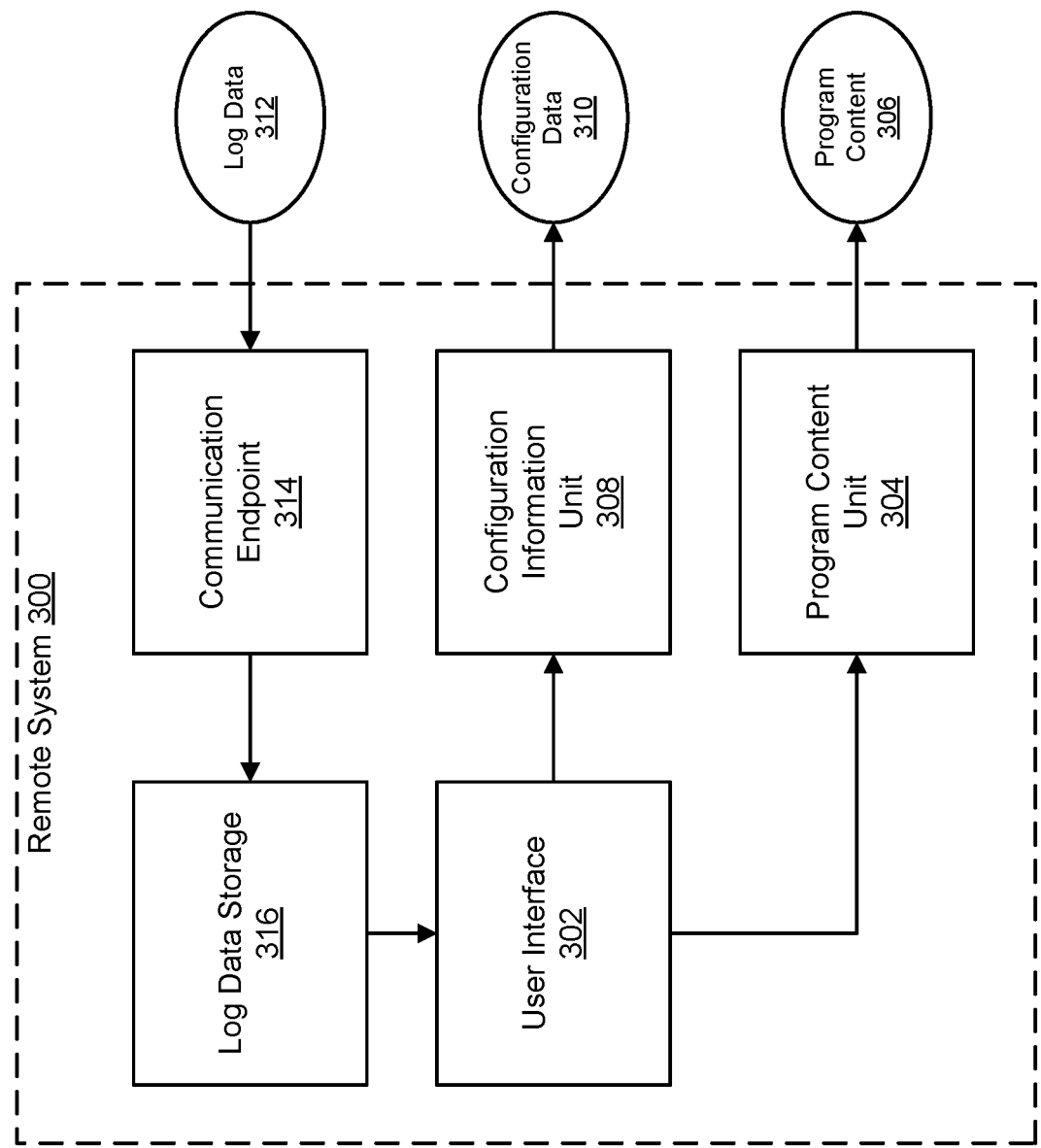
FIG. 3 is a block diagram illustrating an embodiment of a remote system.

FIG. 3 is a block diagram illustrating an embodiment of a remote system. In some embodiments, remote system 300 is remote system 104 of FIG. 1. In various embodiments, remote system 300 provides IT operation management functionality.

In various embodiments, user interface 302 is a software component that receives input from a user. For example, a user may provide logging related commands via a graphical user interface (GUI). In the example illustrated, user interface 302 is an access point for functionality of program content unit 304. Program content unit 304 is a software component for generating and/or transmitting program content 306. In some embodiments, program content 306 is program content 202 of FIG. 2. In some embodiments, program content unit 304 generates script includes that can be transmitted to and stored in program content management unit 204 of FIG. 2. In some embodiments, software developers utilize user interface 302 and program content unit 304 to produce computer code (e.g., JavaScript script includes) to execute on MID server 200 of FIG. 2. For example, computer code can be typed into a text input interface of user interface 302, uploaded to program content unit 304 via user interface 302, and/or selected from pre-generated code stored in program unit 304 through user interface 302. In some embodiments, user interface 302 accepts requests to initiate logging that are transmitted by program content unit 304 to MID server 200 of FIG. 2 to cause logging of data items.

In the example illustrated, user interface 302 is also an access point for functionality of configuration information unit 308. Configuration information unit 308 is a software component for generating and/or transmitting configuration data 310. In some embodiments, configuration data 310 is configuration data 210 of FIG. 2. In various embodiments, configuration information unit 308 stores parameters for configuring how MID server 200 filters log items and returns them to remote system 300 (which log items are returned to remote system 300 and/or stored in MID server 200). These parameters can be selected by a user through user interface 302 (e.g., through a graphical point and click interface that also provides input boxes to enter values associated with the parameters). For example, the user can specify that only log items that match the selected parameters and specified parameter ranges should be transmitted from MID server 200 to remote system 300. Examples of parameters include time period, specific methods/script includes, execution context, tags/categories, log level, timestamp, and other parameters.

In the example illustrated, log data 312 is received by communication endpoint 314. In some embodiments, log data 312 is log data 212 of FIG. 2. In some embodiments, communication endpoint 314 is a REST endpoint. In various embodiments, log data 312 is sent from a MID server to remote system 300 in a manner (e.g., frequency/timing, amount/volume, content/scope, etc.) based on settings provided in configuration data 310. In various embodiments, the received log data 312 is stored in log data storage 316. In some embodiments, log data storage 316 includes a storage device, such as a hard disk drive, a solid-state drive, or other hardware component. In various embodiments, log data is provided by log data storage 316 to user interface 302 for a user to view and analyze the log data. For example, during a debugging session, log data 312 may be streamed to remote system 300 intermittently and the user views the log data in real time via user interface 302. In various embodiments, descriptive information associated with each item of log data 312 (e.g., metadata) is stored in log data storage 316. Filter parameters (e.g., of configuration data 310) associated with each item of log data 312 can also be stored in log data storage 316. For each log item, a timestamp (e.g., with nanosecond precision), vector clock number, tag, log level, execution identifier, log message, and other descriptive information associated with the log item may be stored. Timestamps may be utilized to provide precise correlation with MID server events and determine with confidence the order of log items arriving at remote system 300. Tags and execution identifiers can be utilized to trace particular executions. In various embodiments, user interface 302 is utilized to view log items stored in log data storage 316 according to criteria specified by a user. For example, the user can choose to view log items that meet time period, log level, category/tag, execution identifier, script include, and other criteria.

In the example shown, portions of the communication path between the components are shown. Other communication paths may exist, and the example of FIG. 3 has been simplified to illustrate the example clearly. Although single instances of components have been shown to simplify the diagram, additional instances of any of the components shown in FIG. 3 may exist. The number of components and the connections shown in FIG. 3 are merely illustrative. Components not shown in FIG. 3 may also exist.

Figure 4:
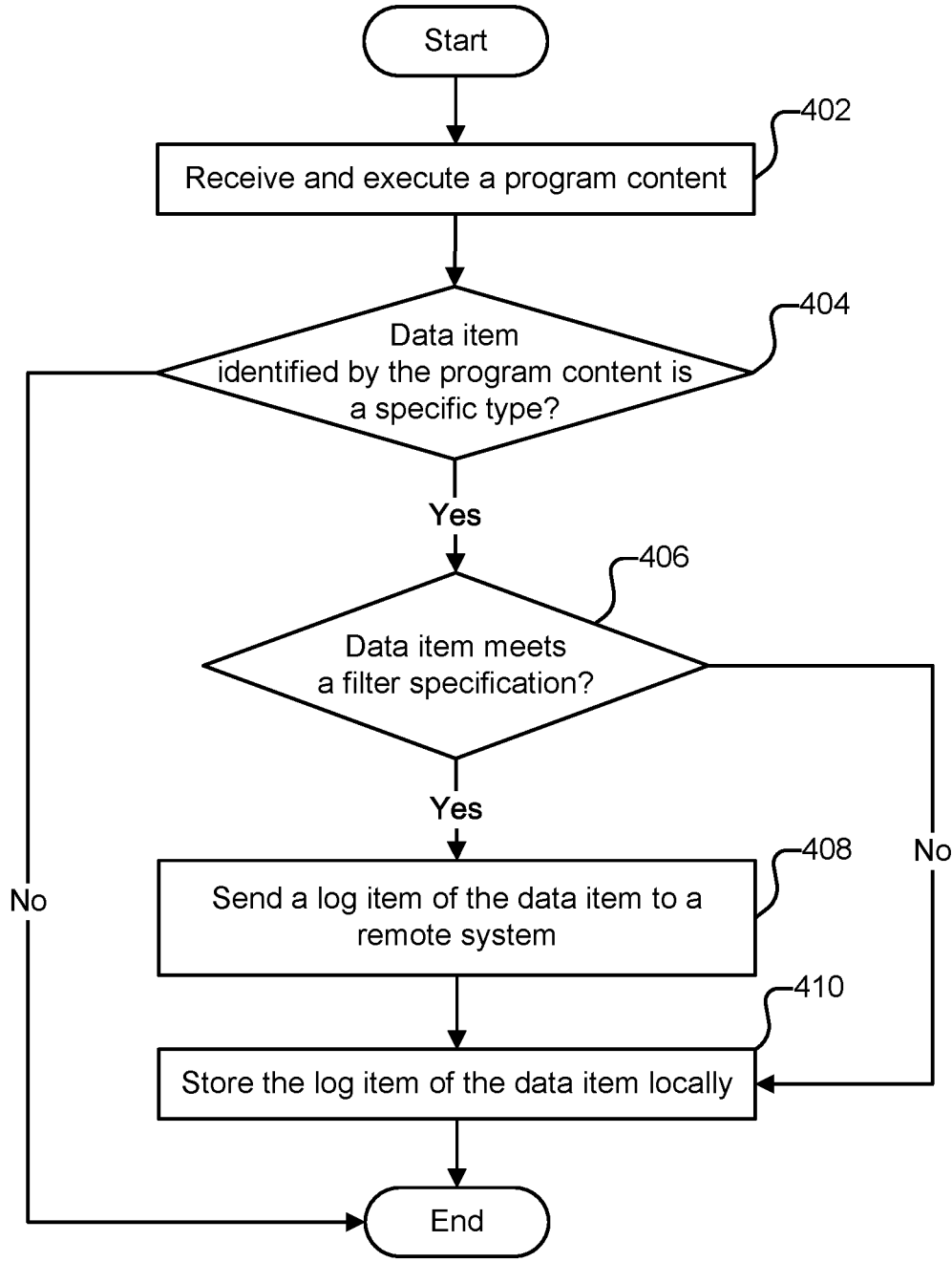
FIG. 4 is a flow chart illustrating an embodiment of a process for performing data item logging based on received parameters.

FIG. 4 is a flow chart illustrating an embodiment of a process for performing data item logging based on received parameters. In some embodiments, the process of FIG. 4 is performed by MID server 200 of FIG. 2.

At 402, a program content is received and executed. In some embodiments, the program content is program content 202 of FIG. 2, is received by program content management unit 204 of FIG. 2, and is executed by logger unit 206 of FIG. 2. In various embodiments, the program content specifies data items to be logged. In various embodiments, data items of a specific type are to be logged and data items not belonging to the specific type are not logged. In some embodiments, the program content is a portion of computer application logic (e.g., script include) that analyzes data items to be potentially logged. Examples of a data item include messages, statuses, values, configurations, parameters, and other descriptive pieces of information concerning computing resources. The data item can also be a file, record, document, report, or any other collection of data.

At 404, it is determined whether a data item identified by the program content is a specific type. Various properties of the data item may be analyzed by the program content to determine whether the data item is the specific type. For example, descriptive data associated with the data item (e.g., metadata) may be examined to determine whether the data item has a specific origin or destination that the program content indicates should be logged, whether the data item is a specific type of computing message or status that the program content indicates should be logged, whether the data item is associated with a specific type of computing configuration, activity, operation, event, process, or application that the program content indicates should be logged, and so forth. If at 404 it is determined that the data item identified by the program content is not the specific type, then it is not logged.

If at 404 it is determined that the data item identified by the program content is the specific type, at 406, it is determined whether the data item meets a filter specification. In various embodiments, the filter specification is based on configuration data 210 of FIG. 2. The filter specification is separate from the program content. Examples of filter specifications include specifications based on time period, specific methods/script includes, execution context, tags/categories, log level, timestamp, and other parameters. If at 406 it is determined that the data item does not meet the filter specification, then 408 is skipped.

If at 406 it is determined that the data item meets the filter specification, at 408, a log item of the data item is sent to a remote system. In some embodiments, the remote system is remote system 300 of FIG. 3. In various embodiments, the log item describes an aspect of the data item. For example, the log item can be a log message or other text-based description associated with the data item. In some scenarios, the log item is an error log item that includes a description of an error that is encountered by a software application, operating system, server, etc. while in operation. Example entries in an error log include table corruption and configuration corruption descriptions. Log items may also provide warning information or other information associated with operation of software applications, operating systems, servers, or other computer software or hardware components. Log items may be associated with information outputted during debugging or tracing of computer system operation.

At 410, the log item of the data item is stored locally. In various embodiments, the log item is stored in storage of a MID server (e.g., MID log storage 208 of FIG. 2). In various embodiments, a plurality of log items is stored in a log file. Storing of the log item locally is not performed in some scenarios. For example, during debugging and trace sessions, log items are typically sent to the remote system but not stored locally. This is because large amounts of data typically associated with debugging and tracing can overwhelm local log storage. Thus, in some scenarios, log items are sent to either the remote system or stored locally, but not both. It is also possible to neither send the log item to the remote system nor store the log item locally if the filter specification is not met.

Figure 5:
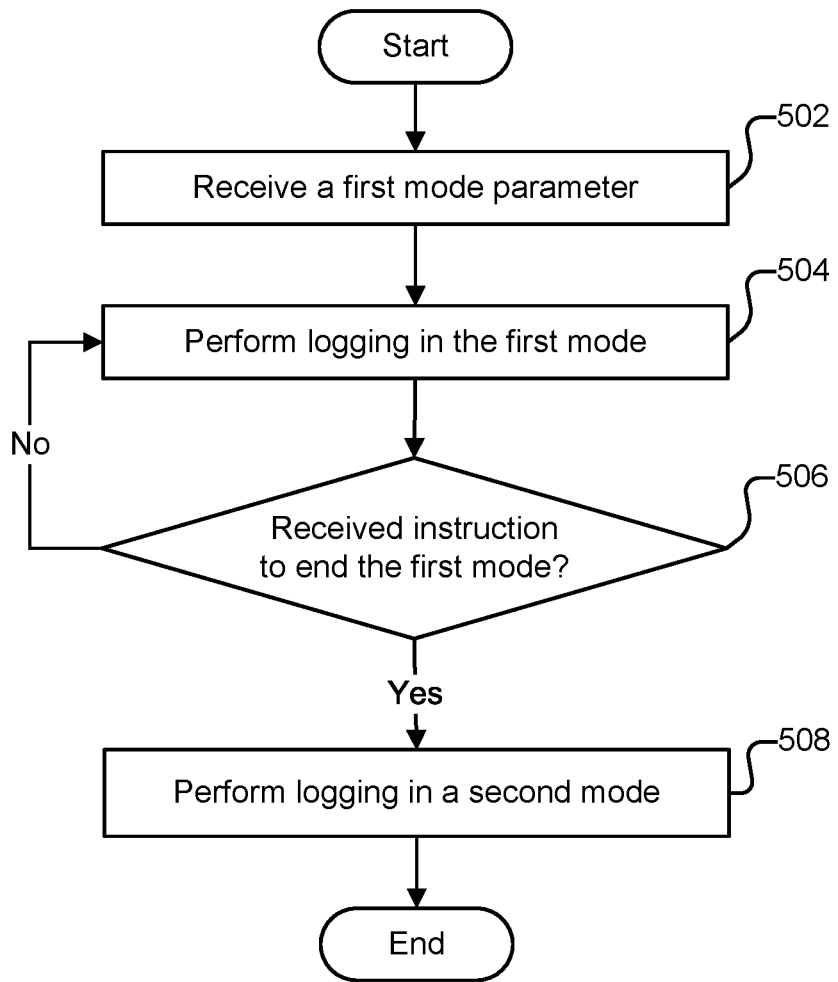
FIG. 5 is a flow chart illustrating an embodiment of a process for switching on and off a specified data item logging mode.

FIG. 5 is a flow chart illustrating an embodiment of a process for switching on and off a specified data item logging mode. In some embodiments, the process of FIG. 5 is performed by MID server 200 of FIG. 2.

At 502, a first mode parameter is received. In some embodiments, the first mode parameter is received by logger unit 206 of MID server 200 of FIG. 2 as a portion of configuration data 210 of FIG. 2. In various embodiments, the first mode parameter specifies a first data item logging mode (a first mode). For example, the first mode can be a debugging mode in which debug level log items are transmitted from MID server 200 of FIG. 2 as log data 212 but not necessarily stored in MID log storage 208 of FIG. 2. Trace mode is another example of a mode in which log items corresponding to that mode are transmitted to a remote system but not stored locally. In various embodiments, the first mode parameter is selected by a user of a remote system (e.g., remote system 300 of FIG. 3) and transmitted to MID server 200 of FIG. 2. In various embodiments, the first mode parameter triggers a start of a session in the first mode (e.g., a debugging session). In various embodiments, computer code (e.g., debugging methods in the form of script includes) are received from the remote system for execution to perform logging in the first mode. In some embodiments, the first mode parameter is accompanied by a request to begin execution of logging in a session corresponding to the first mode parameter (e.g., to being a debugging session). The request can be received by program content management unit 204 of FIG. 2.

At 504, logging is performed in the first mode. In various embodiments, logger unit 206 of FIG. 2 logs data items from computing resources communicatively connected to MID server 200 of FIG. 2 as log items that are transmitted as log data 212 of FIG. 2 (e.g., when the first mode is a debugging mode). In various embodiments, logger unit 206 of FIG. 2 executes program content (e.g., script includes) received from a remote system in which the program content is tailored to data item logging in the first mode. Performing logging in the first mode includes logging data items as log items and transmitting and/or storing the log items according to specifications of the first mode. For example, if the first mode is a debugging mode, the log items may be transmitted to a remote system and not stored locally. It is also possible to both transmit the log items and store them locally if the specifications of the first mode indicate so. In various embodiments, the log items are transmitted in batches (e.g., 5 log items at a time, 10 log items at a time, 50 log items at a time, etc.) according to a received batching level parameter (e.g., received as a part of configuration data 210 of FIG. 2). In various embodiments, transmitted log items are received by the remote system and can be stored (e.g., in log data storage 316 of remote system 300 of FIG. 3) and viewed in real time (e.g., through user interface 302 of remote system 300 of FIG. 3).

At 506, it is determined whether an instruction to end the first mode (and switch to a second mode) has been received. The instruction to end the first mode can come in the form of an updated mode parameter specifying a second data item logging mode (a second mode). For example, the second mode can be indicated by configuration data 210 of FIG. 2. For example, the second mode can be an info mode in which info level log items are stored in MID log storage 208 of FIG. 2 and not transmitted from MID server 200 of FIG. 2. In some embodiments, the second mode parameter is accompanied by a request to stop execution of logging in a session corresponding to the first mode parameter (e.g., debugging session) and begin execution of logging in a session corresponding to the second mode parameter (e.g., info session). The request can be received by program content management unit 204 of FIG. 2. If it is determined at 506 that an instruction to end the first mode has not been received, then logging in the first mode is continued at 504.

If at 506 it is determined that an instruction to end the first mode has been received, at 508, logging in a second mode is performed. For example, if it is determined that an instruction to stop logging in a debugging mode has been received, logging in an info mode may be commenced. In this example, the change in logging mode alters where log items are sent/stored (e.g., storing locally instead of transmitting remotely). Logging according to different modes/methods can be switched according to various properties (e.g., log level in the example above as well as time period of data items, execution parameters, specific script includes, tags/categories, etc.).

Figure 6:
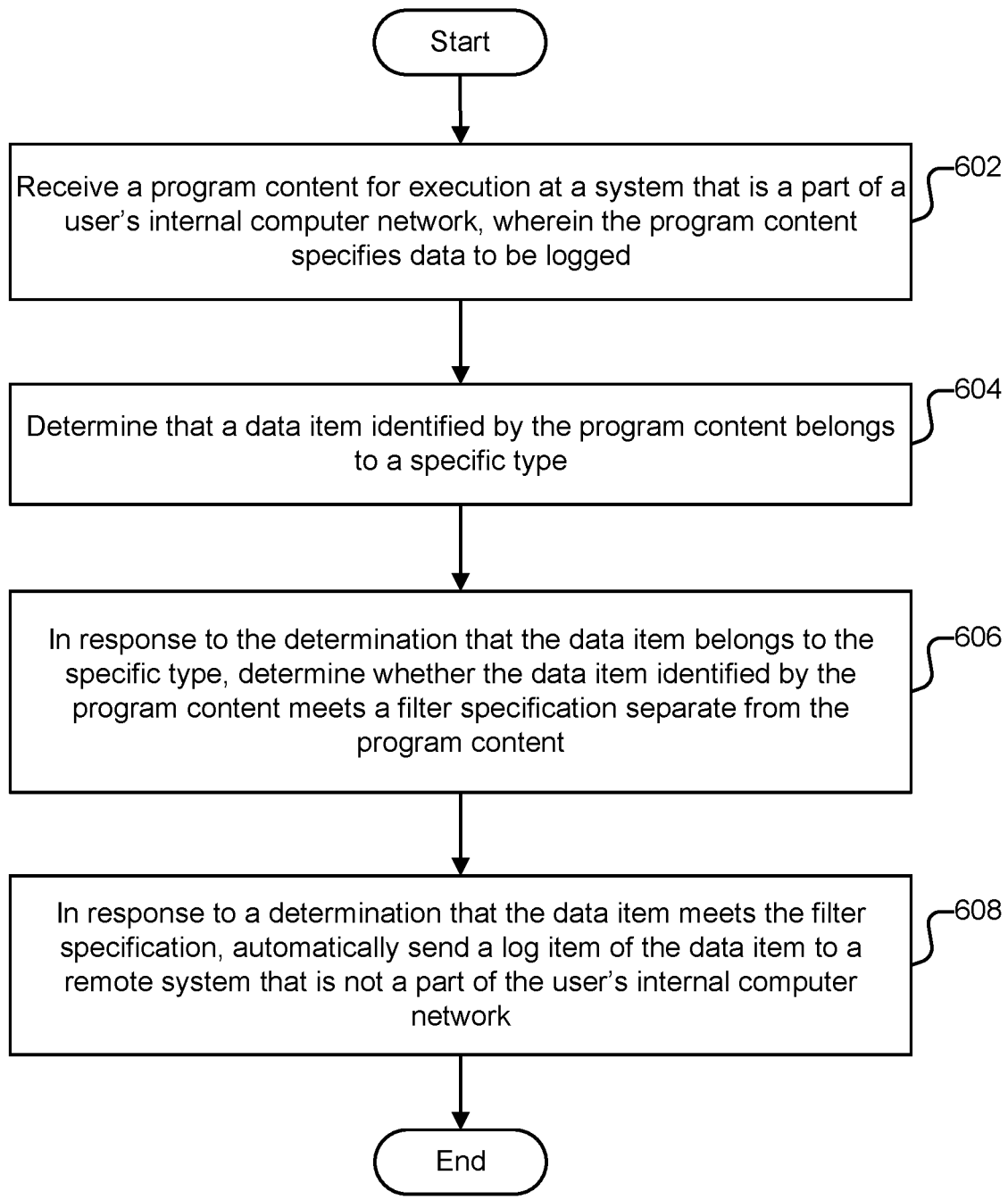
FIG. 6 is a flow chart illustrating an embodiment of a process for transmitting a data item log item to a remote system.

FIG. 6 is a flow chart illustrating an embodiment of a process for transmitting a data item log item to a remote system. In some embodiments, the process of FIG. 6 is performed by MID server 200 of FIG. 2.

At 602, a program content for execution at a system that is a part of a user's internal computer network is received, wherein the program content specifies data to be logged. In some embodiments, the program content is program content 202 of FIG. 2. In some embodiments, the system is MID server 200 of FIG. 2 or MID server 108 of FIG. 1 and the user's internal computer network is user network 102 of FIG. 1.

At 604, it is determined that a data item identified by the program content belongs to a specific type. Various properties of the data item may be analyzed by the program content to determine whether the data item is the specific type. For example, descriptive data associated with the data item as well as the data item itself may be examined to determine whether the data item has a specific origin or destination that the program content indicates should be logged, whether the data item is a specific type of computing message or status that the program content indicates should be logged, whether the data item is associated with a specific type computing configuration, activity, operation, event, process, or application that the program content indicates should be logged, and so forth.

At 606, in response to the determination that the data item belongs to the specific type, it is determined whether the data item identified by the program content meets a filter specification separate from the program content. In some embodiments, the filter specification is one or more configuration parameters that are a part of configuration data 210 of FIG. 2. An example of a filter specification is a parameter for filtering according to log level and/or time period.

At 608, in response to a determination that the data item to be logged meets the filter specification, a log item of the data item is automatically sent to a remote system that is not a part of the user's internal computer network. In some embodiments, the log item is automatically sent by logger unit 206 of MID server 200 of FIG. 2 as log data 212 of FIG. 2. In some embodiments, the remote system is remote system 300 of FIG. 3.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
 receiving a program content for execution at a system that is a part of a user's internal computer network, wherein the program content specifies data to be logged;
 determining that a data item identified by the program content belongs to a specific type;
 in response to the determination that the data item belongs to the specific type, determining whether the data item identified by the program content meets a filter specification separate from the program content, wherein the filter specification indicates a presence of a monitoring mode for diagnosing computer system problems by utilizing debugging computer code that is executed in a same thread as computer code to be debugged; and
 in response to a determination that the data item meets the filter specification, automatically sending a log item of the data item to a remote system that is not a part of the user's internal computer network.

2. The method of claim 1, wherein the program content comprises a script or a part thereof that is executable by a scripting engine.

3. The method of claim 1, wherein the system includes a software application running as a service on a physical computing device of the user's internal computer network.

4. The method of claim 1, wherein the user's internal computer network comprises one or more computer systems that are communicatively connected to the system receiving the program content for execution.

5. The method of claim 1, wherein the user's internal computer network and the remote system are separated by a firewall and the system receiving the program content for execution is an entry point for the remote system into the user's internal computer network.

6. The method of claim 1, wherein the system receiving the program content for execution includes a storage for the log item of the data item.

7. The method of claim 1, further comprising storing the log item of the data item in a log file.

8. The method of claim 1, further comprising receiving a request to execute the program content.

9. The method of claim 1, wherein the data to be logged include descriptive information associated with operation of computing resources.

10. The method of claim 1, further comprising storing the log item of the data item in a storage local to the system receiving the program content for execution in response to the determination that the data item belongs to the specific type.

11. The method of claim 1, wherein the specific type is associated with a specific computing status, activity, operation, event, or process of a computing resource.

12. The method of claim 1, wherein the log item of the data item is combined with at least one other log item to be sent together to the remote system.

13. The method of claim 1, wherein the remote system includes a REpresentational State Transfer (REST) endpoint for receiving the log item of the data item.

14. The method of claim 1, wherein the remote system includes a storage configured to store the log item of the data item.

15. The method of claim 1, wherein the remote system includes an interface configured to display to a user the log item of the data item in real time or substantially real time with respect to the remote system receiving the log item of the data item.

16. A system, comprising:
one or more processors configured to:
receive a program content for execution at a system that is a part of a user's internal computer network, wherein the program content specifies data items to be logged;
determine that a data item identified by the program content belongs to a specific type;
in response to the determination that the data item belongs to the specific type, determine whether the data item identified by the program content meets a filter specification separate from the program content, wherein the filter specification indicates a presence of a monitoring mode for diagnosing computer system problems by utilizing debugging computer code that is executed in a same thread as computer code to be debugged; and
in response to a determination that the data item meets the filter specification, automatically send a log item of the data item to a remote system that is not a part of the user's internal computer network; and
a memory coupled to at least one of the one or more processors and configured to provide at least one of the one or more processors with instructions.

17. A method, comprising:
receiving a program content for execution at a system that is a part of a user's internal computer network, wherein the program content specifies data to be logged;
determining that a data item identified by the program content belongs to a specific type;
in response to the determination that the data item belongs to the specific type, determining whether the data item identified by the program content meets a filter specification separate from the program content;
in response to a determination that the data item meets the filter specification, automatically sending a log item of the data item to a remote system that is not a part of the user's internal computer network;
receiving a different filter specification;
determining whether a different data item meets the different filter specification; and
in response to the determination that the different data item meets the different filter specification, storing a log item of the different data item locally within the user's internal computer network without sending the log item of the different data item to the remote system.

18. The method of claim 17, wherein the program content comprises a script or a part thereof that is executable by a scripting engine.

19. The method of claim 17, wherein the system includes a software application running as a service on a physical computing device of the user's internal computer network.

20. The method of claim 17, wherein the user's internal computer network comprises one or more computer systems that are communicatively connected to the system receiving the program content for execution.

* * * * *